(12) United States Patent
Carlisle et al.

(10) Patent No.: US 7,427,645 B2
(45) Date of Patent: Sep. 23, 2008

(54) ADHESIVE COMPOSITIONS AND TAPES COMPRISING SAME

(75) Inventors: Stuart D. Carlisle, Salisbury, MA (US); Jerry M. Serra, Chelmsford, MA (US)

(73) Assignee: Covalence Specialty Adhesives, LLC, Franklin, MA (US)

( * ) Notice: Subject to any disclaimer, the term of this patent is extended or adjusted under 35 U.S.C. 154(b) by 299 days.

(21) Appl. No.: 10/990,613

(22) Filed: Nov. 17, 2004

(65) Prior Publication Data

US 2005/0171259 A1 Aug. 4, 2005

Related U.S. Application Data

(63) Continuation of application No. 10/071,801, filed on Feb. 7, 2002, now Pat. No. 6,838,500.

(51) Int. Cl.
*C08K 5/13* (2006.01)
*C08K 3/22* (2006.01)
*B32B 7/10* (2006.01)

(52) U.S. Cl. .................. 524/291; 524/432; 428/214

(58) Field of Classification Search .......... 524/291, 524/432; 428/214
See application file for complete search history.

(56) References Cited

U.S. PATENT DOCUMENTS

| | | | | | |
|---|---|---|---|---|---|
| 3,956,223 | A | * | 5/1976 | Chiang et al. | 524/482 |
| 5,283,289 | A | * | 2/1994 | Yamamoto et al. | 525/133 |
| 5,453,465 | A | * | 9/1995 | Yu et al. | 525/179 |
| 5,760,135 | A | * | 6/1998 | Korpman et al. | 525/95 |
| 6,838,500 | B2 | * | 1/2005 | Carlisle et al. | 524/291 |
| 7,081,498 | B2 | | 7/2006 | Moeller et al. | |
| 2003/0166760 | A1 | * | 9/2003 | Taylor et al. | 524/442 |

* cited by examiner

*Primary Examiner*—Tae H Yoon
(74) *Attorney, Agent, or Firm*—Maldjian & Fallon LLC; Jon Fallon, Esq.; John P. Maldjian, Esq.

(57) ABSTRACT

An adhesive composition and tapes utilizing the adhesive compositions are disclosed. A tape utilizing the adhesive composition of the present invention is particularly suitable for use in closure systems associated with air ducts and air connectors. A composition particularly suitable for use as an antioxidant in adhesive compositions is disclosed.

7 Claims, No Drawings

ADHESIVE COMPOSITIONS AND TAPES COMPRISING SAME

RELATED APPLICATIONS

This application is a continuation application of parent application Ser. No. 10/071,801 filed on Feb. 7, 2002, now U.S. Pat. No. 6,838,500.

FIELD OF THE INVENTION

The present invention relates to adhesive compositions, compositions particularly suitable for use as an antioxidant, and tapes comprising said adhesive compositions.

BACKGROUND OF THE INVENTION

Adhesive compositions have utility in various applications, including tapes used for insulating, mounting, sealing, mending, holding, masking, labeling, binding, joining, protecting, and reinforcing functions. Adhesives compositions fail over time and in use. Failure is accelerated in harsh environmental conditions such as prolonged exposure to heat, light, and/or physical stress such as pressure.

It is an object of this invention to provide an adhesive composition capable of withstanding exposure to harsh environmental conditions for extended periods of time.

It is an additional object of this invention to provide a tape utilizing the adhesive composition.

It is an additional object of this invention to provide a tape utilizing the adhesive composition particularly suitable for use in closure systems associated with air ducts and air connectors.

It is a further object of this invention to provide a composition particularly suitable for use as an antioxidant composition in an adhesive composition of the present invention.

BRIEF SUMMARY OF THE INVENTION

The present invention relates to an adhesive composition particularly suitable for use in adhesive tapes. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and/or a component selected from the group consisting of antimicrobials, antibacterials, and antifungals.

In another embodiment a tape comprising the adhesive composition of the present invention is provided. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and a component selected from the group consisting of antimicrobials, antibacterials, and antifungals.

In another embodiment a tape comprising at least one backing having deposited thereon a layer comprising the adhesive composition of the present invention is provided. In more detail the at least one backing may be any backing suitable for providing a tape. The adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and a component selected from the group consisting of antimicrobials, antibacterials, and antifungals.

In a preferred embodiment a tape is described comprising at least one backing; a first layer comprising the adhesive composition of the present invention, having a reinforcement dispersed therein, deposited on the backing; and a second layer comprising the adhesive composition of the present invention deposited on said first layer. In more detail the adhesive composition of the first and second layers comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and a component selected from the group consisting of antimicrobials, antibacterials, and antifungals. The backing may be any backing suitable for providing a tape. The backing may further comprise a metal containing layer deposited on a surface of said backing on which no adhesive composition has been deposited.

In another embodiment a composition particularly suitable for use as an antioxidant in an adhesive composition is disclosed. The composition comprises at least one heat reactive alkyl phenolic resin having a hydroxymethyl reactive group and at least one phenolic antioxidant. The antioxidant composition may further comprise at least one accelerator activator.

DETAILED DESCRIPTION OF THE INVENTION

The present invention relates to an adhesive composition particularly suitable for use in adhesive tapes. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and/or a component selected from the group consisting of antimicrobials, antibacterials, and antifungals.

In another embodiment a tape comprising the adhesive composition of the present invention is provided. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and a component selected from the group consisting of antimicrobials, antibacterials, and antifungals.

In another embodiment a tape comprising at least one backing having deposited thereon a layer comprising the adhesive composition of the present invention is provided. In more detail the at least one backing may be any backing suitable for providing a tape. The adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and a component selected from the group consisting of antimicrobials, antibacterials, and antifungals.

In a preferred embodiment a tape is described comprising at least one backing; a first layer comprising the adhesive composition of the present invention, having a reinforcement dispersed therein, deposited on the at least one backing; and a second layer comprising the adhesive composition of the present invention deposited on said first layer. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and a component selected from the group consisting of antimicrobials, antibacterials, and antifungals. The backing may be any backing suitable for providing a tape. The backing may further comprise a metal containing layer deposited on a surface of said backing on which no adhesive composition has been deposited.

In another embodiment a composition particularly suitable for use as an antioxid in an adhesive composition is disclosed. The composition comprises at least one heat reactive alkyl phenolic resin having a hydroxymethyl reactive group and at least one phenolic antioxidant. The antioxidant composition may further comprise at least one accelerator activator.

In more detail the adhesive composition of the present invention comprises at least one natural or synthetic elastomer, at least one styrene ethylene-butylene styrene block copolymer, at least one heat reactive alkyl phenolic resin having a hydroxymethyl reactive group, and at least one phenolic antioxidant. Any natural or synthetic elastomer may be used. In general, the at least one natural or synthetic elastomer is any macromolecular material that can be stretched under low stress at room temperature. Exemplary natural elastomers include, but are not limited to, natural rubbers and polyisoprenes. Exemplary synthetic elastomers include, but are not limited to, synthetic polyisoprene and its halogenated counterparts, for example polychloroprene rubber, butyl rubber and its halogenated counterparts, for example halobutyl rubber, polybutadiene, polyethylene-co-propylene-co-diene, poly(butadiene-co-styrene), poly(butadiene-co-acrylonitrile), poly(isobutylene-co-isoprene), polystyrene block copolymers with polyisoprene, polyethylene-butadiene and polybutadiene midblocks, poly(ethylene-co-propylene-co-diene), polydimethylsiloxane, polyalkylenesulfide, polyester or polyether urethanes. Mixtures of natural elastomers may be used. Mixtures of synthetic elastomers may be used. Mixtures of natural and synthetic elastomers may be used. Preferably, the at least one natural or synthetic elastomer is a mixture of natural rubber, butyl rubber, and styrene isoprene block copolymer.

The at least one natural or synthetic elastomer in the adhesive composition is present in the adhesive composition in any suitable amount. Preferably, the elastomer is present in the adhesive composition in amounts ranging from about 10 weight percent to about 75 weight percent, more preferably from about 15 weight percent to about 50 weight percent, most preferably from about 28 weight percent to about 32 weight percent.

Any styrene ethylene-butylene styrene block copolymer may be used. For example, the at least one styrene ethylene-butylene styrene block copolymer may be any polymer comprising styrene units and ethylene-butylene units such as a block copolymer having terminal styrene blocks and one or more ethylene-butylene mid-blocks separating the terminal styrene blocks. The styrene ethylene-butylene styrene block copolymers may also be modified as desired, for example to have one or more functionalities. Preferably, the styrene ethylene-butylene styrene block copolymers comprise a styrene content of about 28 weight percent, an ethylene-butylene content of about 70 weight percent and a functionality of about 2 weight percent. More preferably, the functionality is 2-weight percent maleic anhydride. Exemplary styrene ethylene-butylene styrene block copolymers are KRATON FG1901, KRATON FG1921, and KRATON FG1924, commercially available from Kraton Polymers, Inc. (Houston, Tex.). Mixtures of styrene ethylene-butylene styrene block copolymers and functionalized counterparts may be used.

The styrene ethylene-butylene styrene block copolymer may be present in the adhesive composition in any suitable amount. Preferably, the styrene ethylene-butylene styrene block copolymer is present in the adhesive composition in amounts ranging from about 0.5 weight percent to about 5 weight percent, more preferably from about 1 weight percent to about 4.5 weight percent, most preferably from about 2.5 weight percent to about 4 weight percent.

The at least one heat reactive alkyl phenolic resin having a hydroxymethyl reactive group crosslinks unsaturated sites in elastomers. As used herein the heat reactive alkyl phenolic resins may comprise any alkyl phenolic resin having a hydroxymethyl group as a reactive group. A heat reactive alkyl phenolic resin having a hydroxymethyl group as a reactive group requires an additional source of labile halogen to initiate reactivity. Exemplary heat reactive alkyl phenolic resins with a hydroxymethyl reactive group are SP1044 and SP1045 resins, commercially available from Schenectady International (Schenectady, N.Y.). The heat reactive alkyl phenolic resin may further have both hydroxymethyl and halomethyl reactive groups. Preferably, the at least one heat reactive alkyl phenolic resin is a heat reactive brominated octylphenol resin. Exemplary heat reactive alkyl phenolic resins having both hydroxymethyl and halomethyl reactive groups suitable for use in the adhesive compositions of this invention are SP1055 and SP1056 resins, commercially available from Schenectady International (Schenectady, N.Y.). The at least one heat reactive alkyl phenolic resin having a hydroxymethyl reactive group is present in the adhesive composition in any suitable amount. Preferably, the at least one heat reactive alkyl phenolic resin having a hydroxymethyl reactive group is present in amounts ranging from about 0.05 to about 2.50 weight percent, preferably ranging from about 0.25 to about 2.0 percent, more preferably from about 0.3 weight percent to about 1.0 weight percent.

The at least one phenolic antioxidant is any phenolic antioxidant that inhibits elastomer degradation by reaction with chain propagating radicals. Exemplary phenolic antioxidants are IRGANOX 1010, IRGANOX 565, IRGANOX 1076, and IRGANOX 1520D, all of which are commercially available from Ciba Specialty Chemicals, Ardsley, N.Y. Preferably, the at least one phenolic antioxidant is comprised of pentaerythrityl tetrakis [3-(3,5-di-tert-butyl-4-hydroxyphenyl) propionate]. Mixtures of phenolic antioxidants may be utilized.

The at least one phenolic antioxidant is present in the adhesive composition in any suitable amount. Preferably, the at least one phenolic antioxidant is present in the adhesive composition in an amount ranging from 0.1-2.5 weight percent, preferably from 0.5-2.0 weight percent, more preferably from 0.75-1.25 weight percent. Most preferably, the adhesive composition comprises about 1.0 weight percent phenolic antioxidant.

The adhesive composition may further comprise at least one accelerator activator. The at least one accelerator activator may comprise any metal oxide that functions as an accelerator activator in increasing the elastomer vulcanization rate. Exemplary metal oxides suitable for use in the adhesive compositions of the present invention are zinc oxide, magnesium oxide, and lead oxide. Preferably, the metal oxide is zinc oxide.

The adhesive composition may further comprise a tackifier to improve the tack of the adhesive composition. The tackifier may comprise any suitable material, preferably a hydrocarbon resin material or mixtures thereof. Exemplary tackifiers are ESCOREZ 1102, ESCOREZ 1304, and ESCOREZ 1315, available from ExxonMobil Chemical (Houston, Tex.); WINGTAK resins available from Goodyear Chemicals (Akron, Ohio); PICCOTAC 1100 and POLYPALE 100 available from Eastman Chemicals (Kingsport, Tenn.). Preferably, the tackifier comprises a mixture of ESCOREZ 1102 and ESCOREZ 1304 tackifiers.

The adhesive composition may further comprise a component selected from the group consisting of antimicrobials, antibacterials, and antifungals. Antimicrobials, antibacterials, and antifungals reduce and/or eliminate elastomer degradation initiated by microbes, bacteria or fungus. An example of a suitable antimicrobial, antibacterial, and antifungal component particularly suited for use in the adhesive composition of the present invention is MICROCHEK P commercially available from Ferro Corporation.

In another embodiment of the present invention there is described a tape comprising the adhesive composition of the present invention. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, fillers, and a component selected from the group consisting of antimicrobials, antibacterials, and antifungals.

In another embodiment of the present invention a tape comprising at least one backing having deposited thereon a layer comprising the adhesive composition of the present invention is provided. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, antimicrobials, antibacterials, antifungals, or other conventional additives and fillers.

Any suitable backing may be used in forming the tape. For example, the at least one backing may be comprised of any film, foil, fabric, woven or nonwoven, or combinations thereof. The at least one backing may comprise multiple adjacent layers, for example multiple laminated layers. The at least one backing may be of any thickness and is preferably at least about 0.5 mils, more preferably at least about 1 mil, most preferably at least about 1.5 mils. Preferably, the at least one backing is a single layer having a thickness of 2 mils. The backing material may be comprised of any material suitable for supporting an adhesive composition. The at least one backing may be comprised of any natural polymer, synthetic polymer, or mixtures thereof. Materials particularly suitable for use as the backing include polyolefins. Exemplary polyolefins are polypropylene and polyethylene. Exemplary polyethylenes are low density polyethylene, linear low density polyethylene, medium density polyethylene, and high density polyethylene. Preferably, the backing comprises a single layer of low density polyethylene.

Tapes comprising a backing and an adhesive composition deposited on the backing may be produced utilizing any conventional techniques well-known in the art. Exemplary processes are coating, laminating, and calendering.

In a preferred embodiment of the present invention a tape comprising at least one backing; a first layer comprising the adhesive composition of the present invention, having a reinforcement dispersed therein, deposited on a surface of the backing; and a second layer comprising the adhesive composition of the present invention deposited on said first layer is provided. In more detail the adhesive composition comprises at least one natural or synthetic elastomer, at least one styrene ethylene-butylene styrene block copolymer, at least one heat reactive alkyl phenolic resin having a hydroxymethyl reactive group, and at least one phenolic antioxidant. The adhesive composition may further comprise at least one accelerator activator, tackifiers, antimicrobials, antibacterials, antifungals, or other conventional additives and fillers.

Any suitable backing may be used in forming the tape. For example, the at least one backing may be comprised of any film, foil, fabric, woven or nonwoven, or combinations thereof. The at least one backing may comprise multiple adjacent layers, for example multiple laminated layers. The at least one backing may be of any thickness and is preferably at least about 0.5 mils, more preferably at least about 1 mil, most preferably at least about 1.5 mils. Preferably, the at least one backing is a single layer having a thickness of 2 mils. The backing material may be comprised of any material suitable for supporting an adhesive composition. The at least one backing may be comprised of any natural polymer, synthetic polymer, or mixtures thereof. Materials particularly suitable for use as the backing include polyolefins. Exemplary polyolefins are polypropylene and polyethylene. Exemplary polyethylenes are low density polyethylene, linear low density polyethylene, medium density polyethylene, and high density polyethylene. Preferably, the backing comprises a single layer of low density polyethylene.

The at least one backing may further comprise a metal containing layer deposited on a surface of said backing on which no adhesive has been deposited. The metal containing layer may be continuous or discontinuous. Backings with metal containing layers thereon may be produced utilizing any conventional techniques well-known in the art. Preferably, a continuous layer of metal is vacuum deposited on the surface of the backing.

A reinforcement may be dispersed within the adhesive composition. The reinforcement may be in any suitable form such as films, foils, or woven or non-woven scrims or fabrics. Exemplary materials suitable for use as the reinforcement are polyesters, polycottons, polyester/polycotton blends, rayons, nylons, glass fibers, metals, metal flakes, and paper. Preferably, the reinforcement comprises a woven fabric scrim comprised of a polycotton, polyester, or a blend thereof.

Tapes comprising at least one backing, a first layer of the adhesive composition of the present invention having a reinforcement dispersed therein, and a second layer of the adhesive composition of the present invention, may be produced utilizing any conventional technique well-known in the art. Exemplary processes are coating, laminating, and calendering.

In another embodiment a composition suitable for use as an antioxidant in an adhesive composition comprising at least one heat reactive alkyl phenolic resin having a hydroxymethyl reactive group and at least one phenolic antioxidant is provided. The composition may further comprise at least one accelerator activator. The at least one heat reactive alkyl phenolic resin having a hydroxymethyl reactive group crosslinks unsaturated sites in elastomers. As used herein the heat reactive alkyl phenolic resins may comprise any alkyl phenolic resin having a hydroxymethyl group as a reactive group. A heat reactive alkyl phenolic resin having a hydroxymethyl group as a reactive group requires an additional source of labile halogen to initiate reactivity. Exemplary heat reactive alkyl phenolic resins with a hydroxymethyl reactive group are SP1044 and SP1045 resins, commercially available from Schenectady International (Schenectady, N.Y.). The heat reactive alkyl phenolic resin may further have both hydroxymethyl and halomethyl reactive groups. Preferably, the at least one heat reactive alkyl phenolic resin is a heat reactive brominated octylphenol resin. Exemplary heat reactive alkyl phenolic resins suitable for use in the adhesive compositions of this invention are SP1055 and SP1056 resins, commercially available from Schenectady International (Schenectady, N.Y.).

The at least one phenolic antioxidant may be any phenolic antioxidant that inhibits elastomer degradation by reaction with chain propagating radicals. Exemplary phenolic antioxidants are IRGANOX 1010, IRGANOX 565, IRGANOX 1076, and IRGANOX 1520D, all of which are commercially available from Ciba Specialty Chemicals, Ardsley, N.Y. Preferably, the at least one phenolic antioxidant is comprised of pentaerythrityl tetrakis [3-(3,5-di-tert-butyl-4-hydroxyphenyl)propionate]. Mixtures of phenolic antioxidants may be utilized.

The at least one accelerator activator may comprise any metal oxide that functions as an accelerator activator in increasing the elastomer vulcanization rate. Exemplary metal oxides suitable for use in the composition of the present invention are zinc oxide, magnesium oxide, and lead oxide. Preferably, the metal oxide is zinc oxide.

The at least one heat reactive alkyl phenolic resin having a hydroxymethyl reactive group and the at least one phenolic antioxidant are present in the composition in any suitable amount. Preferably, the at least one heat reactive alkyl phenolic resin having a hydroxymethyl reactive group is present in the composition in amounts ranging from 10-80 weight percent. The at least one phenolic antioxidant is present in the composition in amounts ranging from 20-90 weight percent. Preferably, the composition comprises 40 weight percent heat reactive alkyl phenolic resin having a hydroxymethyl reactive group and 60 weight percent phenolic antioxidant.

The following example illustrates the use of the adhesive composition of the present invention in a tape. It should be clearly understood that the form of the present invention herein described is illustrative only and is not intended to limit the scope of the invention.

EXAMPLE

An adhesive composition was prepared by mixing 19.2 weight percent Smoke Sheet natural rubber from Goodyear Tire and Rubber Co.; 3.2 weight percent maleic anhydride modified styrene ethylene-butylene styrene block copolymer commercially sold as KRATON FG 1901 from Kraton Polymers; 9.8 weight percent styrene isoprene styrene block copolymer commercially sold as VECTOR 4111 available from Dexco Polymers; 0.1 weight percent reclaimed butyl rubber, 0.8 weight percent Butyl 268, butyl rubber commercially available from ExxonMobil Chemical; 1.0 weight percent IRGANOX 1010 commercially available from Ciba Specialty Chemicals; 0.7 weight percent heat reactive brominated octylphenol resin commercially available from Schenectady International; 1.6 weight percent titanium dioxide; 0.8 weight percent antimicrobial commercially sold as MICROCHEK P from Ferro Corporation; 31.1 weight percent calcium carbonate; 1.7 weight percent zinc oxide; 0.02 weight percent Odor Mask; 17.1 weight percent hydrocarbon tackifying resin commercially sold as ESCOREZ 1102 from ExxonMobil Chemical; 13.5 weight percent hydrocarbon tackifying resin commercially sold as ESCOREZ 1304 from ExxonMobil Chemical.

A first layer of the adhesive composition was deposited, by coating, on to the surface of a metal coating roll. A reinforcement comprising a 44×20 thread count polycotton fabric was then dispersed within the first layer of the adhesive composition on the metal coating roll. A second layer of the adhesive composition was then deposited, by coating, on to the first layer of the adhesive composition containing the reinforcement dispersed therein. The adhesive and reinforcement containing adhesive layers were then stripped from the surface of the metal coating roll and deposited on a backing of low density polyethylene film to which a continuous layer of aluminum had been deposited. The metallized low density polyethylene film is commercially available from Dunmore Corporation. The adhesive and reinforcement containing adhesive layers are deposited on to the non-metallized surface of the film such that the first layer of adhesive is in contact with the non-metallized surface of the film backing.

An Unwind Adhesion Test is used to determine the performance characteristics of the finished tape. The Unwind Adhesion Test measures the adhesive strength of tapes when unwound from their own backings and from the surface of a galvanized sheet metal circular duct after accelerated heat aging. The Unwind Adhesion Test uses a constant-rate-of-extension machine identified as Instron Model 4464 commercially available from Instron, Canton, Mass. A recording device, for example a strip-chart recorder or computer, is used for measuring the sample peel adhesion properties of the tapes disclosed herein. The constant-rate-of-extension machine is equipped with a mandrel with bearings which roll freely and suitable grips capable of clamping a specimen firmly. A galvanized sheet metal circular duct having a diameter of approximately 4 inches and a length of about 6 inches was used for testing the tapes disclosed herein.

Test specimens are cut 14 inches in length and 1 inch in width. The tape is then wrapped circumferentially around the circular duct with hand tension. Light hand pressure is used on all surfaces of the tape to remove any visible signs of air pockets. Prior to aging, the specimens are stored at 23+/-2° C. and 50+/-5% relative humidity for about 16-24 hours. The samples are then placed in a circulating hot air oven at 110° C. Samples are removed and tested at 7 day intervals. Prior to performing the testing the samples are removed from the circulating hot air oven and allowed to equilibrate to standard test conditions of approximately 23° C. and 50% humidity. A tabbed end of the tape is peeled from the duct about two inches from the test side. The duct is then mounted in the testing machine and the free end fastened into the other grip. A separation rate of 12 inches/minute is applied. The adhesion force necessary to remove the tape from its own backing or from the metal surface is recorded using the recording device. The average value between the 1 inch and 3 inch readings is recorded. The testing is performed on three samples and the values averaged. Table I shows the results of the testing of the tape of this invention using the Unwind Adhesion Test disclosed herein.

TABLE I

| DAYS AGING AT 110° C. | Peel Force Required (oz/inch) | Percent Retained Adhesive Pull Strength |
|---|---|---|
| 0 | 64 | 100.0 |
| 7 | 82 | 128.1 |
| 10 | 56 | 87.5 |
| 15 | 55 | 85.9 |

TABLE I-continued

| DAYS AGING AT 110° C. | Peel Force Required (oz/inch) | Percent Retained Adhesive Pull Strength |
|---|---|---|
| 18 | 50 | 78.1 |
| 21 | 68 | 106.3 |
| 29 | 106 | 165.6 |
| 35 | 153 | 239.1 |
| 42 | 136 | 212.5 |
| 60 | 63 | 98.4 |

As can be seen above in Table I the Peel Force after 60 days aging at 110° C. is substantially the same as the peel force at 0 days aging. For applications requiring tapes that are capable of withstanding harsh environmental conditions for extended periods of time the performance exhibited by the adhesive compositions and tapes of this invention is desirable.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A composition suitable for use as an antioxidant comprising:
    at least one natural or synthetic solid elastomer;
    at least one styrene ethylene butylene styrene solid block copolymer;
    at least one heat reactive alkyl phenolic resin having a hydroxymethyl reactive group; and
    at least one phenolic antioxidant.

2. The composition of claim 1 further comprising at least one accelerator activator.

3. The composition of claim 2 wherein said at least one accelerator activator is zinc oxide.

4. The composition of claim 1 wherein said heat reactive alkyl phenolic resin comprises heat reactive brominated octylphenol resin.

5. A method for covering a closure system for use with air ducts and air connectors by applying a tape comprising:
    an adhesive composition comprising at least one natural or synthetic solid elastomer, at least one styrene ethylene-butylene styrene solid block copolymer, at least one heat reactive alkyl phenolic resin having at least a hydroxymethyl reactive group, and at least one phenolic antioxidant; and
    a backing having deposited thereon said adhesive composition.

6. A method for covering a closure system for use with air ducts and air connectors by applying a tape comprising:
    at least a backing;
    a first layer of adhesive deposited on a surface of said backing, said first layer of adhesive having a reinforcement dispersed therein, said first layer of adhesive comprising at least one natural or synthetic solid elastomer, at least one styrene ethylene-butylene styrene solid block copolymer, at least one heat reactive alkyl phenolic resin having at least a hydroxymethyl reactive group, and at least one phenolic antioxidant; and
    a second layer of adhesive deposited on said first layer of adhesive, wherein said second layer of adhesive comprises at least one natural or synthetic solid elastomer, at least one styrene ethylene-butylene styrene solid block copolymer, at least one heat reactive alkyl phenolic resin having at least a hydroxymethyl reactive group, and at least one phenolic antioxidant.

7. The composition of claim 1 wherein said heat reactive alkyl phenolic resin has both hydroxymethyl and halomethyl reactive groups.

* * * * *